United States Patent [19]
Abe et al.

[11] Patent Number: 4,460,743
[45] Date of Patent: Jul. 17, 1984

[54] POLYPHENYLENE ETHER RESIN COMPOSITION

[75] Inventors: Katsuhiro Abe; Shin-ichi Yamauchi; Akira Ohkubo, all of Yokkaichi, Japan

[73] Assignee: Mitsubishi Petrochemical Co., Ltd., Tokyo, Japan

[21] Appl. No.: 454,080

[22] Filed: Dec. 28, 1982

[30] Foreign Application Priority Data

Feb. 16, 1982 [JP] Japan .................................. 57-22030

[51] Int. Cl.$^3$ .............................................. C08L 61/04
[52] U.S. Cl. ...................................... 525/68; 525/63; 525/64; 525/905
[58] Field of Search ...................... 525/63, 64, 68, 905

[56] References Cited

U.S. PATENT DOCUMENTS 3,749,693 7/1973 Cooper ................................. 525/393
3,929,931 12/1975 Izawa et al. ......................... 525/905

Primary Examiner—J. Ziegler
Attorney, Agent, or Firm—Oblon, Fisher, Spivak, McClelland & Maier

[57] ABSTRACT

A composition comprising a polyphenylene ether, a polystyrene, a polyphenylene ether-grafted polyolefin and, optionally, a polystyrene-grafted polyolefin is disclosed. This composition has excellent impact resistance and, due to dispersion phase being a crystalline resin, an excellent rigidity.

13 Claims, No Drawings

POLYPHENYLENE ETHER RESIN COMPOSITION

FIELD OF THE INVENTION

This invention relates to a polyphenylene ether-containing resin composition and, more particularly, to a polyphenylene ether resin composition having improved processability, mold release characteristics, and impact resistance.

BACKGROUND OF THE INVENTION

Polyphenylene ether is an extremely useful thermoplastic resin having excellent heat resistance, mechanical properties, electric properties, hot water resistance, acid resistance, alkali resistance, selfextinguishing characteristics, etc., and is finding wide applications as engineering plastic material. However, this resin has a serious defect that it has high melt viscosity and poor processability due to its high glass transition temperature. In addition, it shows poor mold release characteristics upon injection molding and has poor impact resistance as engineering plastic.

In order to remove the above-described defects, particularly, to improve processability, it has been conducted to blend the resin with a polyolefin or a styrenic polymer such as polystyrene, rubber-modified polystyrene, styrene/acrylonitrile/butadiene copolymer, etc., as disclosed in Japanese Patent Publication Nos. 7069/67 and 17812/68, and U.S. Pat. No. 3,383,435.

In the composition composed of polyphenylene ether and high molecular polyolefin, the two polymers are not uniformly mixed with each other and form a "sea-island" structure. Further, the two polymers are essentially poor in compatibility with each other, and, hence, in the interface of the "sea-island", there is extremely weak interaction. Consequently, the resulting composition is fragile and has reduced mechanical strength and impact strength. And, when receiving a shear stress upon molding such as injection molding, they respectively agglomerate in the direction of the resin stream due to their essentially no compatibility with each other to form a stratum structure, and the resulting moldings are delaminated in a laminar state, thus being unable to be practically used. In order to remove this defect, the use of low-molecular, crystalline polyolefin in place of high-molecular polyolefin has been proposed in, for example, Japanese Patent Publication No. 39015/73. However, this cannot fundamentally solve the problem due to the essential incompatibility between polyphenylene ether and polyolefin.

And, in the composition comprising polyphenylene ether and polystyrene, an increase in amount of polystyrene deteriorates, in a manner of arithmetic mean, heat-resistant temperature, mechanical strength, impact strength, etc., though it serves to improve processability. In order to prevent the concurrent deterioration of impact strength, etc., rubber-modified polystyrene, or high-impact polystyrene, is used as the polystyrene component. However, addition of a rubbery component leads to a reduction in rigidity of the resulting cmposition.

SUMMARY OF THE INVENTION

It has been found that a composition prepared by adding a polyphenylene ether-grafted polyolefin to the resin composition comprising a polyphenylene ether and a styrenic polymer shows excellent processability and mold release characteristics. In this improved composition, the polyphenylene ether-grafted polyolefin has an essentially good compatibility with the polyphenylene ether, and hence it does not undergo reduction in mechanical strength and shows improved impact strength.

Further, it has been found that addition of a polystyrene-grafted polyolefin serves to more improve the impact strength of the polyphenylene ether resin composition without spoiling mechanical and thermal properties, thus having achieved the present invention.

Accordingly, an object of the present invention is to provide a polyphenylene ether resin composition comprising 80 to 20 parts by weight of a polyphenylene ether, 20 to 80 parts by weight of a styrenic polymer, and 0.1 to 50 wt%, based on the total weight of the polyphenylene ether and the styrenic polymer, of a polyphenylene ether-grafted polyolefin.

Another object of the present invention is to provide a polyphenylene ether resin composition comprising 80 to 20 parts by weight of a polyphenylene ether, 20 to 80 parts by weight of a styrenic polymer, 0.1 to 50 wt%, based on the total weight of the polyphenylene ether and the styrenic polymer, of a polyphenylene ether-grafted polyolefin and 1 to 80 wt%, based on the total weight of the polyphenylene ether and the styrenic polymer, of a polystyrene-grafted polyolefin, which has excellent processability and impact resistance.

In the composition of the present invention, the polyolefin component dispersed in a matrix composed of the polyphenylene ether and the styrenic polymer has a good compatibility with polyphenylene ether and, when a polystyrene-grafted polyolefin is used together, it seemingly shows an increased compatibility with the styrenic polymer and, as a result, the interface interaction in the "sea-island" structure in which polyolefin forms the dispersed phase is seemingly more increased.

Accordingly, the polyphenylene ether resin composition of the present invention shows good processability and outstandingly improved impact strength with keeping excellent tensile strength and heat distortion temperature, thus finding wide applications as engineering plastics.

DETAILED DESCRIPTION OF THE INVENTION

The polyphenylene ether as herein used in the present invention has a structure represented by the following formula:

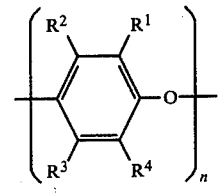

wherein $R^1$, $R^2$, $R^3$ and $R^4$ each independently represents a hydrogen atom, a halogen atom, a hydrocarbyl group or substituted hydrocarbyl group, a cyano group, an alkoxy group, a phenoxy group, a nitro group, an amino group or a sulfo group, and n represents an integer of 20 to 800 indicating a polymerization degree. Specific examples of $R^1$, $R^2$, $R^3$ and $R^4$ include a hydrogen atom, a chlorine atom, a bromine atom, an iodine atom, a methyl group, an ethyl group, a propyl group, a butyl group, an allyl group, a phenyl group, a benzyl group, a methylbenzyl group, a chloromethyl group, a bromomethyl group, a cyanoethyl group, a cyano group, a methoxy group, an ethoxy group, a phenoxy group, a nitro group, an amino group, a sulfo group, etc. Specifically, there are illustrated poly-2,6-dimethyl-4-phenylene ether, poly-2,6-diethyl-1,4-phenylene ether, poly-2,6-dipropyl-1,4-phenylene ether, poly-2-methyl-6-isopropyl-1,4-phenylene ether, poly-2,6-dimethoxy-1,4-phenylene ether, poly-2,6-dichloromethyl-1,4-phenylene ether, poly-2,6-diphenyl-1,4-phenylene ether, poly-2,6-dinitrilo-1,4-phenylene ether, poly-2,6-dichloro-1,4-phenylene ether, poly-2,5-dimethyl-1,4-phenylene ether, etc.

The styrenic resin to be used in the present invention is a homopolymer or copolymer containing at least 25% of polymerization units derived from a compound represented by the following formula:

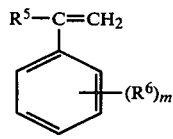

wherein $R^5$ represents a hydrogen atom, a lower alkyl group or a halogen atom, $R^6$ represents a hydrogen atom, a halogen atom, a lower alkyl group or a vinyl group, and m represents an integer of 1 to 5. Specific examples thereof include homopolymers such as polystyrene, poly-α-methylstyrene, and polychlorostyrene, polystyrene modified, for example, with rubber, styrene/acrylonitrile copolymer, styrene/butadiene/acrylonitrile copolymer, styrene/maleic anhydride copolymer, styrene/maleic anhydride/butadiene copolymer, etc.

The polyphenylene ether-grafted polyolefin as used in the present invention comprises a polyolefin chain to which polyphenylene ether is chemically bonded and, generally, those wherein polyphenylene ether is chemically bonded to the chain of a polyolefin which is olefin random copolymer or block copolymer are used. For example, compounds represented by the following formula are used.

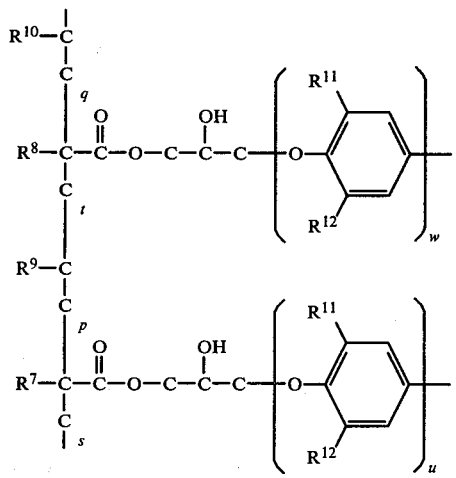

wherein $R^7$, $R^8$, $R^9$ and $R^{10}$ each independently represents a hydrogen atom, a methyl group, a methyl ester group, an ethyl ester group, a carboxyl group, a maleic anhydride group or a hydrocarbyl branch containing 3 to 5,000 carbon atoms, $R^{11}$ and $R^{12}$ each independently represents a hydrogen atom, a halogen atom, a hydrocarbyl group, a substituted hydrocarbyl group, an alkoxy group or a phenoxy group, u and w each represents an integer of 20 to 1,000, p, q, s and t each represents the content of indicated moiety, with p and q being integers selected so that (p+q) falls within the range of from 50 to 50,000 and s and t being numbers selected so that (s+t) falls within the range of from 1.0 to 50.

The polyolefin to be used has a crystallinity of 20 wt% or above, preferably 26% or above, in a state of having functional groups capable of reacting with polyphenylene ether or the derivative thereof.

These polyphenylene ether-grafted polyolefins are obtained by grafting polyolefin having carboxy groups or acid anhydride groups in the main chain or side chains (e.g., ethylene/acrylic acid copolymer, ethylene/methacrylic acid copolymer, maleic anhydride-modified polypropylene, maleic anhydride-modified polyethylene, or maleic anhydride-modified ethylene/vinyl acetate copolymer) with glycidylated polyphenylene ether, prepared by reacting a polyphenylene ether with epichlorohydrin in the presence of an alkali such as sodium hydroxide, in the presence of an alkali ingredient.

Alternatively, the polyphenylene ether-grafted polyolefins can be obtained by grafting a polyolefin having glycidyl groups in side chains (e.g., ethylene/glycidyl (meth)acrylate copolymer or ethylene/vinyl acetate/glycidyl (meth)acrylate copolymer) with a polyphenylene ether or a polyphenylene ether having an acid group or an acid anhydride group.

The graft reaction is conducted by using as a catalyst an alkali such as sodium hydroxide or an amine such as tri-n-butylamine, known as a catalyst for a reaction between glycidyl group and hydroxy group, carboxylic acid group or cyclic acid anhydride group, in a solution state or a molten state. When an elevated temperature of 150° C. or above is employed, the graft reaction proceeds even in the absence of the catalyst, thus polyphenylene ether-grafted polyolefin being able to be obtained without the catalyst.

The molecular weight of the polyphenylene ether moiety of said graft polymer is desirably lying in the range of from 5,000 to 100,000. If the molecular weight is less than 5,000, the graft polymer is somewhat fragile, thus the resulting composition having a reduced mechanical strength. On the other hand, when polyphenylene ether having a molecular weight of more than 100,000 is used, the graft reaction with polyolefin becomes difficult to proceed due to the high molecular effect. The number average molecular weight of the polyolefin chain in the graft polymer is in the range of from 1,000 to 100,000, with 3,000 to 50,000 being particularly preferably from the point of the balance of physical properties of the composition of the present invention obtained by compounding the graft polymer.

The polystyrene-grafted polyolefin referred to in the present invention can be obtained by grafting styrenic copolymer having carboxylic acid groups or cyclic acid anhydride groups in the main chain or side chains of polystyrene (e.g., styrene/maleic anhydride copolymer, styrene/citraconic acid anhydride copolymer, styrene/itaconic acid anhydride copolymer, styrene/aconitic acid anhydride copolymer, styrene/a- crylic acid copolymer or styrene/methacrylic acid copolymer) with polyolefin having glycidyl groups in side chains thereof and having a crystallinity of 20% or above measured by X-ray diffraction (e.g., ethylene/glycidyl (meth)acrylate copolymer or ethylene/vinyl acetate/glycidyl (meth)acrylate copolymer).

The graft reaction is performed in the same manner as with the aforesaid polyphenylene ether-grafted polyolefin. When an elevated temperature of 150° C. or above is employed, the graft reaction proceeds even in the absence of a catalyst to give a polystyrene-grafted polyolefin.

As the polystyrene copolymer having carboxylic groups or cyclic acid anhydride groups in the main chain or side chains thereof for preparing the polystyrene-grafted polyolefin to be used in the present invention, those which contain 50 wt% or more styrene unit are preferable, with the content of the carboxylic acid or cyclic acid anhydride unit being desirably 3 wt% or more, preferably 5 wt% or more. If the content of the styrene unit falls down the above-described level, the resulting graft polymer has a reduced compatibility with the polyphenylene ether-polystyrene matrix and, if the content of the carboxylic acid or cyclic acid anhydride unit is less than 3 wt%, progress of the graft reaction itself is depressed.

As the polyolefin having glycidyl groups in the side chains thereof to be used for the synthesis of the graft polymer, those which have a number average molecular weight of 1,000 to 100,000 can be used but, from the point of balanced physical properties of the composition of the present invention, those which have a number average molecular weight of 3,000 to 50,000 are particularly preferable.

The polystyrene-grafted polyolefin used in the present invention can be obtained by reacting a styrenic copolymer having glycidyl group with a polyolefin having carboxylic acid group or cyclic acid anhydride group.

Preferable contents of the respective polymer components in the composition of the present invention are: 80 to 20 parts by weight of polyphenylene ether, 20 to 80 parts by weight of styrenic polymer, and 0.1 to 50 wt%, preferably 1 to 30 wt%, based on the sum of the weight of the polyphenylene ether and that of the styrenic polymer, of polyphenylene ether-grafted polyolefin and 0 to 80 wt%, preferably 1 to 80 wt%, particularly preferably 1 to 30 wt%, of polystyrene-grafted polyolefin. When the content of the polyphenylene ether is less than 20 parts by weight, i.e., when the content of the styrenic polymer exceeds 80 parts by weight, the resulting composition has a reduced mechanical strength (e.g., tensile strength) and a reduced heat resistance (e.g., heat deformation properties). When the amount of the polyphenylene ether-grafted polyolefin added is less than 0.1 wt% based on the sum of the weight of the polyphenylene ether and that of the styrene copolymer, there result insufficient effects of the addition and, when more than 50 wt%, there result reduced mechanical strength and heat deformation properties. When the amount of the polystyrene-grafted polyolefin exceeds 80 wt% based on the sum of the weight of the polyphenylene ether and that of the styrene copolymer, there results a reduced mechanical strength.

In the case of mixing a uniform mixture of polyphenylene ether and styrenic polymer with polyolefin, the mechanical strength of the interface of molded sea-island structure is so weak due to the essential incompatibility of polyolefin with polyphenylene ether or styrenic polymer that, when a stress such as impact is applied thereto, cracks are liable to be formed from the interface, resulting in destruction. The polyphenylene ether-grafted polyolefin and the polystyrene-grafted polyolefin to be used in the present invention have an essentially improved compatibility with a polyphenylene ether or styrenic polymer to be used as a matrix. The composition of the present invention containing the thus-modified polyolefin has excellent processability and mold release characteristics and, in addition, shows much more improved mechanical strength, particularly impact strength, than is expected. This may be attributed to that, since polyphenylene ether-grafted polyolefin and polystyrene-grafted polyolefin to be dispersed in a matrix composed of polyphenylene ether or a uniform mixture of polyphenylene ether and styrenic polymer have an essential compatibility with the matrix, they are uniformly distributed as extremely fine dispersion units, which serves to break up the stress when a mechanical impact is applied thereto and strengthen the interface with the matrix to prevent progress of destruction from the interface.

The resin composition of the present invention can be prepared by any process; for example, by melt-mixing respective components using various kneaders such as a single screw extruder, twin-screw extruder, Banbury type mixer, roll, Brabender Plastogram, etc., and cooling the resulting mixture to solidify it; or by preparing solutions or emulsions of respective polymer components, uniformly mixing the solutions or emulsions, and removing a solvent therefrom. The order of adding respective polymer components may be any of possible orders but, from the economical point of view, it is advantageous to add the whole components at the same time.

Needless to say, rubbery polymers, glass fibers, inorganic fillers, heat resistance-imparting agents, fire retardants, colorants, etc., can be added, if necessary, for a particular practical end-use.

Additionally, since the two graft polymers, i.e., polyphenylene ether-grafted polyolefin and polystyrene-grafted polyolefin, to be used as the components of the composition of the present invention can be prepared by graft reaction in a molten state in the absence of catalysts using polyolefin having glycidyl groups in the side chains thereof, the resin composition of the present invention can be directly prepared, in some cases, by kneading glycidyl group-containing polyolefin with polyphenylene ether, styrenic polymer, and styrenic copolymer having carboxylic acid groups or cyclic acid anhydride groups in the main chain or side chains of polystyrene at 150° C. or higher. Because, this kneading procedure can concurrently cause uniform mixing of polyphenylene ether and polystyrene, production of polyphenylene ether-grafted polyolefin by the graft reaction between polyphenylene ether and glycidylated polyolefin, and production of polystyrene-grafted polyolefin by the graft reaction between styrenic copolymer and glycidylated polyolefin.

The present invention will now be described in more detail by referring to examples, which, however, are not to be construed as limiting the present invention.

First, processes for preparing polyphenylene ether-grafted polyolefins (P-graft polymers A to E) and polystyrene-grafted polyolefins (S-graft polymers F to H) are illustrated below.

Preparation of Glycidylated Polyphenylene Ether: (Preparation Example 1)

10 l of epichlorohydrin was charged in a stainless steel-made autoclave of 30 l capacity, then 300 g of poly-2,6-dimethyl-1,4-phenylene ether polymer powder (made by Mitsubishi Petrochemical Co., Ltd.; intrinsic viscosity in chloroform at 30° C.: 0.47 dl/g). Then, the contents were heated through the outer jacket and kept at 100° C. for about 30 minutes under stirring to thereby completely dissolve the polymer, and 50 cc of a 10% sodium hydroxide aqueous solution was added thereto, followed by conducting the reaction at 100° C. for 3 hours under a nitrogen atmosphere. After completion of the reaction, epichlorohydrin was distilled off under reduced pressure, and the thus-obtained polymer was dissolved in 5 l of chloroform. Solids (produced NaCl and excess NaOH) in the polymer solution were filtered off, and a mixed solvent of methanol/water (50/50) was added to the filtrate to re-precipitate the polymer. After washing three times with 10 l of the same solvent, the polymer was dried at 100° C. for about 10 hours to obtain glycidylated polyphenylene ether (hereinafter abbreviated as GPPO). Titration of the resulting polymer by a perchloric acid-CTAB method according to ISO-3001 revealed that the amount of glycidyl group in the polymer was $5.6 \times 10^{-3}$ mol per 100 g of the polymer. On the other hand, the number average molecular weight was determined to be 18,000 by osmometry. Thus, the polymer was found to have about one glycidyl group per molecule. As a result of determining terminal hydroxy group before and after the reaction according to the method of E. Shchori et al. described in J. App. Polym. Sci. Polym. Sympo., 34, p. 103, it was confirmed that 94% of hydroxy group disappeared after the reaction. These data clearly demonstrate that the following reaction proceeded almost quantitatively.

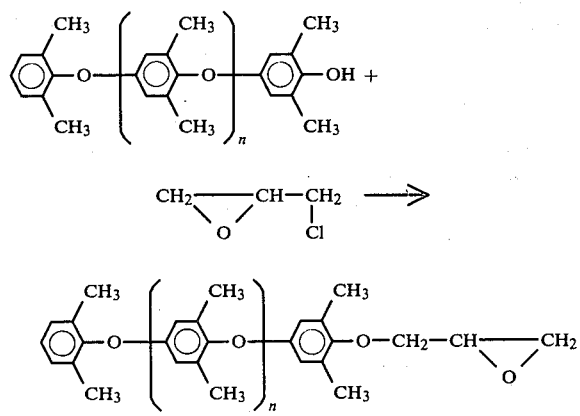

Preparation of P-Graft Polymer A: (Preparation Example 2)

10 l of toluene and 200 g of GPPO obtained in Preparation Example 1 were charged in an autoclave of 30 l capacity, and 100 g of an ethylene/acrylic acid copolymer (made by Mitsubishi Petrochemical Co., Ltd.; content of ethylene: 96.3 wt%; content of acrylic acid: 3.7 wt%, number average molecular weight: 15,000) was added thereto, followed by heating the mixture up to 110° C. to dissolve under a nitrogen atmosphere. Then, 5 ml of N,N-dimethylaniline was added thereto, and the reaction was conducted at 110° C. for 8 hours under stirring. After completion of the reaction, the contents were cooled to an ordinary temperature, and 15 l of acetone was added thereto to precipitate and collect a produced polymer by filtration. The polymer obtained by this procedure was dissolved in hot xylene, and the solution was allowed to cool at an ambient temperature and subjected to centrifugation. This procedure was repeated twice, and the thus-obtained precipitate was subjected to analysis of determining GPPO through IR absorption spectrum utilizing a calibration curve to find that 164 g of xylene insoluble GPPO was contained per 100 g of the ethylene/acrylic acid copolymer. On the other hand, the amount of unreacted GPPO recovered as a xylene-soluble component was found to be 18%. Thus, it is seen that 1.4 molecules of GPPO was grafted on the average per molecule of the ethylene/acrylic acid copolymer. With the progress of the graft reaction, an IR absorption due to stretching vibration of carbonyl group in IR absorption spectrum became to show a shoulder absorption at 1745 cm$^{-1}$ assignable to ester bond. Thus, it was confirmed that a graft copolymer having the following structural formula was obtained.

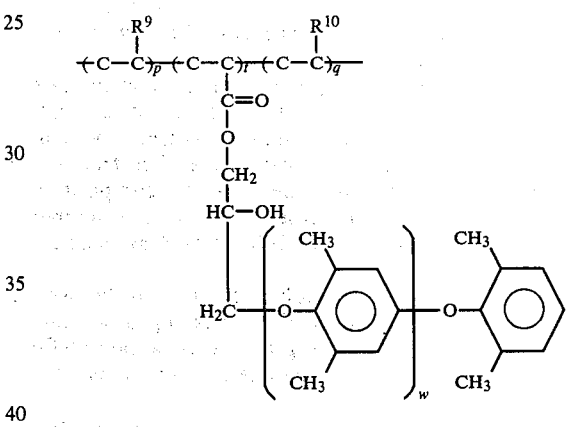

Preparation of P-Graft Polymer B: (Preparation Example 3)

10 l of xylene, 200 g of GPPO obtained in Preparation Example 1, and maleic anhydride-modified polypropylene (made by Mitsubishi Petrochemical Co., Ltd.; content of maleic anhydride: 1.3 wt%; number average molecular weight: 18,000) were charged in an autoclave of 30 l capacity, and dissolved by heating to 120° C. under a nitrogenous atmosphere. Then, 10 ml of N,N-dimethylaniline was added thereto, and the reaction was conducted at 120° C. for 8 hours under stirring. After completion of the reaction, the contents were cooled to an ordinary temperature, and 15 l of acetone was added thereto to precipitate the polymer, which was then collected by filtration. Analysis of the thus-obtained polymer in the same manner as in Preparation Example 2 revealed that the maleic anhydride group of maleic anhydride-modified polypropylene and the terminal epoxy group of GPPO reacted with each other to graft the polyphenylene ether to the polypropylene.

Preparation of P-Graft Polymer C: (Preparation Example 4)

By using maleic anhydride-modified polyethylene (made by Mitsubishi Petrochemical Co., Ltd.; content of maleic anhydride: 2.3 wt%; number average molecular weight: 12,000) in place of the maleic anhydride-modified polypropylene used in Preparation Example 3 and otherwise following the procedure described in Preparation Example 3, there was obtained a polyphenylene ether-grafted polyethylene.

Preparation of P-Graft Polymer D: (Preparation Example 5)

10 l of toluene, 200 g of poly-2,6-dimethyl-1,4-phenylene ether polymer powder shown in Preparation Example 1, and 100 g of ethylene/glycidyl methacrylate copolymer (made by Mitsubishi Petrochemical Co., Ltd.; MFR=8; content of glycidyl methacrylate; 4.7 wt%) were charged in an autoclave of 30 l capacity and, after dissolving the contents at 110° C., 5 ml of tri-n-butylamine was added thereto, followed by stirring the contents at 110° C. for 5 hours. After completion of the reaction, a produced polymer was precipitated by adding acetone and collected by filtration. The proportion of poly-2,6-dimethyl-1,4-phenylene ether in a xyleneinsoluble component determined with this polymer in the same manner as in Preparation Example 2 was 62 wt%.

Preparation of P-Graft Polymer E: (Preparation Example 6)

100 Parts of poly-2,6-dimethyl-1,4-phenylene ether polymer (made by Mitsubishi Petrochemical Co., Ltd.; intrinsic viscosity in chloroform at 30° C.: 0.47 dl/g), and 50 parts by weight of an ethylene/glycidyl methacrylate copolymer (made by Mitsubishi Petrochemical Co., Ltd.; MFR=8; content of glycidyl methacrylate: 4.7 wt%) and 0.01 part of dimethyl benzylamine were dry-blended in a super-mixer and kneaded at 280° C. in a twin-screw extruder made by Ikegai Iron Works, Ltd. to thereby allow graft reaction to proceed. Analysis of the thus-obtained composition in the same manner as in Preparation Example 2 revealed that the proportion of poly-2,6-dimethyl-1,4-phenylene ether in a xyleneinsoluble component was 48%.

Preparation of S-Graft Polymer F: (Preparation Example 7)

10 l of xylene was charged in a stainless steel-made autoclave of 30 l capacity, and 100 g of a styrene/maleic anhydride copolymer (made by Arco Chemical Co., Ltd,; content of styrene: 92 wt%; content of maleic anhydride: 8 wt%), and, as a polyolefin, 100 g of an ethylene/vinyl acetate/glycidyl methacrylate copolymer (made by Mitsubishi Petrochemical Co., Ltd.; MFR=3; content of vinyl acetate: 4 wt%; content of glycidyl methacrylate: 8 wt%) were added thereto. The contents were heated through an outer jacket and kept at 140° C. for about 30 minutes under stirring to thereby completely dissolve the polymers. Then, 5 ml of tri-n-butylamine was added thereto, and the reaction was carried out at 140° C. for 5 hours. After completion of the graft reaction, the contents were allowed to cool to an ordinary temperature, and methanol was added thereto to preicpitate a produced polymer. The precipitate was washed several times with methanol, and dried at 80° C. for about 10 hours to obtain polystyrene-grafted polyolefin (S-graft polymer F).

About 1 g of the powder of the thus-obtained reaction product was accurately weighed, and 200 ml of dioxane was added thereto which was a solvent for only the styrene copolymer. After extracting at 90° C. for 10 hours, the solution was cooled to an ordinary temperature and filtered. The residue was weighed and subjected to a measurement of IR absorption spectrum. Absorptions at 13.9μ and 16.3μ were used as key bands for determining the ethylene copolymer component and the styrene copolymer component, respectively. The content of the styrene copolymer component having grafted to the polyethylene component and remaining in the insoluble was determined by utilizing a calibration curve obtained previously by using samples prepared by solution blending. The content of grafting styrene copolymer in the extraction residue was 42%. The extraction loss determined by gravimetry was 19%. IR absorption spectrum of the insoluble revealed an appearance of an absorption at 5.7μ assignable to ester bond, thus production of an intended graft copolymer being confirmed.

Preparation of S-Graft Polymer G: (Preparation Example 8)

A polystyrene-grafted polyolefin (S-Graft polymer G) was obtained in the same manner as in Preparation Example 7 except for using 100 g of an ethylene/glycidyl methacrylate copolymer (made by Mitsubishi Petrochemical Co., Ltd.; MFR=6; content of glycidyl methacrylate: 8 wt%) as polyolefin in place of the ethylene/vinyl acetate/glycidyl methacrylate copolymer.

Analysis of the resulting graft polymer in the same manner as in Preparation Example 7 revealed that the dioxane extraction loss was 12%, and that the proportion of grafting styrene copolymer in the dioxane-insoluble was 45%.

Preparation of S-Graft Polymer H: (Preparation Example 9)

100 Parts by weight of an ethylene/vinyl acetate/glycidyl methacrylate copolymer (made by Mitsubishi Petrochemical Co., Ltd.; MFR=3; content of vinyl acetate: 8 wt%; content of glycidyl methacrylate: 4 wt%) and 100 parts by weight of a styrene/maleic anhydride copolymer (nade by Arco Chemical Co., Ltd.; styrene content: 8 wt%) were dry-blended in a super-mixer and kneaded at 200° C. in a twin-screw extruder (made by Ikegai Iron Works, Ltd.) to allow the graft reaction to proceed. Analysis of the thus-obtained graft polymer (S-graft polymer H) conducted in the same manner as in Preparation Example 1 revealed that the dioxane extraction loss was 14%, and that the content of grafting styrene copolymer in the dioxane insoluble was 42%.

EXAMPLE A1

50 Parts by weight of a poly-2,6-dimethyl-1,4-phenylene ether polymer (made by Mitsubishi Petrochemical Co., Ltd.; intrinsic viscosity in chloroform at 30° C.: 0.47 dl/g) and 50 parts of a polystyrene (made by Mitsubishi Monsanto Co.; HF-77), and 10 parts by weight of a polyphenylene ether-grafted ethylene/acrylic acid copolymer (P-graft polymer A) prepared in Preparation Example 2 were dry-blended in a super-mixer and kneaded in a twin-screw extruder made by Ikegai Iron Works, Ltd. to pelletize. The thus-obtained composition was molded into test pieces by means of an in-line injection molding machine made by Meiki Seisakusho to measure various physical properties. Further, a spiral flow test was conducted at an injection pressure of 800 kg/cm² and a molding temperature of 280° C. using a metal mold of 2.0 mm in section thickness and 8 mm in width. The results thus-obtained are shown in Table A1.

COMPARATIVE EXAMPLES A1 TO A3

A comparative resin composition not containing P-graft polymer A used in Example A1 (Comparative Example A1) and comparative resin compositions using an ethylene/acrylic acid copolymer (made by Mitsubishi Petrochemical Co., Ltd.; content of acrylic acid: 3.7 wt%; number average molecular weight: 15,000) in place of P-graft polymer A (Comparative Examples A2 and A3) were prepared in the same manner as in Example A1 and injection molded. The results thus-obtained are also shown in Table A1.

The results in Table A1 clearly show that the resin composition of the present invention is an excellent molding material which has excellent processability and which has a remarkably improved impact strength with keeping mechanical strength and thermal properties.

TABLE A1

| | Compounding (parts by weight) | | Spiral Flow (mm) | Izod Impact Strength (kg · cm/cm) | Tensile Strength (kg/cm$^2$) | Heat Distortion Temperature (°C.) |
|---|---|---|---|---|---|---|
| Example A1 | Poly-2,6-dimethyl-1,4-phenylene ether | 50 | 380 | 11.3 | 730 | 138 |
| | Polystyrene | 50 | | | | |
| | p-Graft polymer A | 10 | | | | |
| Comparative Example A1 | Poly-2,6-dimethyl-1,4-phenylene ether | 50 | 270 | 4.6 | 710 | 138 |
| | Polystyrene | 50 | | | | |
| Comparative Example A2 | Poly-2,6-dimethyl-1,4-phenylene ether | 50 | 390 | 1.8 | 560 | 137 |
| | Polystyrene | 50 | | | | |
| | Ethylene/acrylic acid copolymer | 10 | | | | |
| Comparative Example A3 | Poly-2,6-dimethyl-1,4-phenylene ether | 57 | 380 | 2.2 | 590 | 140 |
| | Polystyrene | 50 | | | | |
| | Ethylene/acrylic acid copolymer | 3 | | | | |

EXAMPLES A2 TO A5

P-graft polymer A used in Example A1 was added in varying amounts to a composition composed of 50 parts by weight of poly-2,6-dimethyl-1,4-phenylene ether and 50 parts by weight of polystyrene under the same procedures and conditions as in Example A1 to prepare resin compositions. The resulting compositions were injection-molded to conduct the same tests on physical properties as in Example A1. The results thus-obtained are shown in Table A2.

TABLE A2

| Example No. | Amount of Added Graft Polymer A (wt %) | Spiral Flow (mm) | Izod Impact Strength (kg · cm/cm) | Tensile Strength (kg/cm$^2$) | Heat Distortion Temperature (°C.) |
|---|---|---|---|---|---|
| A2 | 0.2 | 290 | 8.8 | 760 | 139 |
| A3 | 5.0 | 360 | 9.7 | 760 | 138 |
| A4 | 15.0 | 410 | 12.6 | 730 | 138 |
| A5 | 30.0 | 510 | 9.3 | 710 | 137 |

EXAMPLE A6

A resin composition was prepared in the same manner as in Example A1 except for using 10 parts of the polyphenylene ether-grafted polypropylene (P-graft polymer B) prepared in Preparation Example 3 in place of P-graft polymer A used in Example A1, and injection molded to conduct the same tests on physical properties as in Example A1. The results thus-obtained are shown in Table A3.

COMPARATIVE EXAMPLES A4 AND A5

Resin compositions (Comparative Examples A4 and A5) obtained by using polypropylene (made by Mitsubishi Petrochemical Co., Ltd.; Noblene TA-2) in place of P-graft polymer B were prepared in the same manner under the same conditions as in Example A6, and injection molded to conduct the same tests on physical properties as in Example A1. The results thus-obtained are shown in Table A3. Additionally, the results of foregoing Comparative Examples A1 were also shown therein for comparison.

TABLE A3

| | Compounding (parts by weight) | | Spiral Flow (mm) | Izod Impact Strength (kg · cm/cm) | Tensile Strength (kg/cm$^2$) | Heat Distortion Temperature (°C.) |
|---|---|---|---|---|---|---|
| Example A6 | Poly-2,6-dimethyl-1,4-phenylene ether | 50 | 370 | 10.8 | 740 | 138 |
| | Polystyrene | 50 | | | | |
| | P-Graft polymer B | 10 | | | | |
| Comparative Example A1 | Poly-2,6-dimethyl-1,4-phenylene ether | 50 | 270 | 4.6 | 710 | 138 |
| | Polystyrene | 50 | | | | |
| Comparative Example A4 | Poly-2,6-dimethyl-1,4-phenylene ether | 50 | 390 | 2.1 | 560 | 137 |
| | Polystyrene | 50 | | | | |
| | Polypropylene | 10 | | | | |

TABLE A3-continued

|  | Compounding (parts by weight) |  | Spiral Flow (mm) | Izod Impact Strength (kg · cm/cm) | Tensile Strength (kg/cm²) | Heat Distortion Temperature (°C.) |
|---|---|---|---|---|---|---|
| Comparative Example A5 | Poly-2,6-dimethyl-1,4-phenylene ether | 57 | 360 | 2.5 | 590 | 141 |
|  | Polystyrene | 50 |  |  |  |  |
|  | Polypropylene | 3 |  |  |  |  |

EXAMPLE A7

A resin composition was prepared in the same manner as in Example A1 except for using 10 parts by weight of the polyphenylene ether-grafted polyethylene (P-graft polymer C) prepared in Preparation Example 4 in place of P-graft polymer A used in Example A1, and injection molded to conduct the same tests on physical properties as in Example A1. The results thus-obtained are shown in Table A4.

COMPARATIVE EXAMPLES A6 AND A7

Resin compositions (Comparative Examples A6 and A7) obtained by using polyethylene (made by Mitsubishi Petrochemical Co., Ltd.; YUKALON LM-30) in place of P-graft polymer C were prepared in the same manner under the same conditions as in Example A1, and injection molded to conduct the same tests on physical properties. The results thus-obtained are also shown in Table A4 together with the results of Comparative Example A1.

TABLE A4

|  | Compounding (parts by weight) |  | Spiral Flow (mm) | Izod Impact Strength (kg · cm/cm) | Tensile Strength (kg/cm²) | Heat Distortion Temperature (°C.) |
|---|---|---|---|---|---|---|
| Example A7 | Poly-2,6-dimethyl-1,4-phenylene ether | 50 | 410 | 9.8 | 730 | 138 |
|  | Polystyrene | 50 |  |  |  |  |
|  | P-Graft polymer C | 10 |  |  |  |  |
| Comparative Example A1 | Poly-2,6-dimethyl-1,4-phenylene ether | 50 | 270 | 4.6 | 710 | 138 |
|  | Polystyrene | 50 |  |  |  |  |
| Comparative Example A6 | Poly-2,6-dimethyl-1,4-phenylene ether | 50 | 420 | 2.1 | 540 | 138 |
|  | Polystyrene | 50 |  |  |  |  |
|  | Polyethylene | 10 |  |  |  |  |
| Comparative Example A7 | Poly-2,6-dimethyl-1,4-phenylene ether | 57 | 390 | 2.4 | 580 | 141 |
|  | Polystyrene | 50 |  |  |  |  |
|  | Polyethylene | 3 |  |  |  |  |

EXAMPLES A8 AND A9

A resin composition was prepared in the same manner as in Example A1 except for using 10 parts of a polyphenylene ether-grafted ethylene/glycidyl methacrylate copolymer (P-graft polymer D) prepared in Preparation Example 5 in place of P-graft polymer A used in Example A1, and injection molded to conduct the same tests on physical properties. The results thus-obtained are shown in Table A5 (Example A8). Excellent material properties were obtained as in Example A1.

A resin composition was prepared in the same manner as in Example A1 except for using 10 parts of a polyphenylene ether-grafted ethylene/glycidyl methacrylate copolymer (P-graft polymer E) prepared in Preparation Example 6 in place of P-graft polymer D, and injection molded to conduct the same tests on physical properties. The results thus-obtained are shown in Table A5 (Example A9).

TABLE A5

|  | Compounding (parts by weight) |  | Spiral Flow (mm) | Izod Impact Strength (kg · cm/cm) | Tensile Strength (kg/cm²) | Heat Distortion Temperature (°C.) |
|---|---|---|---|---|---|---|
| Example A8 | Poly-2,6-dimethyl-1,4-phenylene ether | 50 | 320 | 12.3 | 740 | 139 |
|  | Polystryrene | 50 |  |  |  |  |
|  | P-Graft polymer D | 10 |  |  |  |  |
| Example A9 | Poly-2,6-dimethyl-1,4-phenylene ether | 50 | 330 | 10.3 | 720 | 138 |
|  | Polystyrene | 50 |  |  |  |  |
|  | P-Graft polymer E | 10 |  |  |  |  |

EXAMPLE A10

50 Parts by weight of the polyphenylene ether polymer and 50 parts by weight of polystyrene used in Example A1 were dry-blended with 10 parts by weight of an ethylene/glycidyl methacrylate/vinyl acetate copolymer (made by Mitsubishi Petrochemical Co., Ltd.; MFR=8; content of glycidyl methacrylate: 8.9 wt%; content of vinyl acetate: 4.5 wt%) in a super-mixer, and kneaded in a twin-screw extruder made by Ikegai Iron Works, Ltd. to pelletize. Thus, a resin composition was obtained. Analysis of the composition of the xylene-insoluble in the same manner as in Preparation Example 2 revealed that the content of the polyphenylene ether component was 21 wt%, that the content of the ethylene/glycidyl methacrylate/vinyl acetate copolymer was 79 wt%, and that about 5 wt% of the added polyphenylene ether polymer grafted to the ethylene/-glycidyl methacrylate/vinyl acetate copolymer. Physical properties of test pieces prepared by injection molding the composition are shown in Table A6.

TABLE A6

| | Compounding (parts by weight) | | Spiral Flow (mm) | Izod Impact Strength (kg·cm/cm) | Tensile Strength (kg/cm²) | Heat Distortion Temperature (°C.) |
|---|---|---|---|---|---|---|
| Example A10 | Poly-2,6-dimethyl-1,4-phenylene ether | 50 | 360 | 9.7 | 720 | 138 |
| | Polystyrene | 50 | | | | |
| | Ethylene/glycidyl methacrylate/vinyl acetate copolymer | 10 | | | | |

EXAMPLE B1

50 Parts by weight of a poly-2,6dimethyl-1,1-phenylene ether polymer (made by Mitsubishi Petrochemical Co., Ltd.; intrinsic viscosity in chloroform at 30° C.: 0.46 dl/g), 50 parts by weight of polystyrene (made by Mitsubishi Monsanto Co.; HF-77), 20 parts by weight of polyphenylene ether-grafted polyolefin (P-graft polymer A) prepared in Preparation Example 2, and 20 parts by weight of polystyrene-grafted polyolefin (S-graft polymer F) prepared in Preparation Example 7 were dry-blended in a super mixer, and kneaded at 280° C. in a twin-screw extruder made by Ikegai Iron Works, Ltd. to pelletize. The thus-obtained composition was molded into test pieces by means of an in-line injection molding machine made by Meiki Seisakusho to measure izod impact strength (JIS-K-7110), tensile strength (JIS-K-7113), and heat distortion temperature (JIS-K-7207). The results of the measurements are shown in Table B1.

COMPARATIVE EXAMPLES B1 and B2

A comparative composition not containing P-graft polymer A and S-graft polymer F used in Example B1 (Comparative Example B1) and a comparative composition containing only P-graft polymer A (Comparative Example B2) were prepared in the same manner as in Example B1, and injection molded into test pieces to measure the physical properties. The results thus-obtained are also shown in Table B1. Additionally, in the case of not using the graft polymers, the amount of polyphenylene ether or polystyrene was increased to make the relative content of polyphenylene ether equal to that of polystyrene in the resin composition.

TABLE B1

| | Example B1 | Comparative Example B1 | Comparative Example B2 |
|---|---|---|---|
| Composition (parts by weight) | | | |
| Poly-2,6-dimethyl-1,4-phenylene ether | 30 | 40 | 30 |
| Polystyrene | 40 | 50 | 50 |
| P-Graft polymer A | 20 | — | 20 |
| S-Graft polymer F | 20 | — | — |
| Physical Properties | | | |
| Izod impact strength (kg·cm/cm) | 24.3 | 3.2 | 9.5 |
| Tensile strength (kg/cm²) | 530 | 690 | 530 |
| Heat distortion temperature (°C.) | 118 | 119 | 118 |

The results in Table B1 clearly show that the resin composition of the present invention is an excellent molding material which has a remarkably improved impact strength with keeping mechanical strength and thermal properties.

EXAMPLES B2 to B5

Resin compositions were obtained in the same manner as in Example B1 except for using, respectively, P-graft polymers B, C, D and E prepared in Preparation Examples 3 to 6 in place of P-graft polymer A used in Example B1. Physical properties of the compositions are tabulated in Table B2.

COMPARATIVE EXAMPLE B3

Physical properties of a resin composition obtained in the same manner as in Example B4 except for omitting S-graft polymer F were measured. The results thus-obtained are shown in Table B2. Additionally, the amount of polystyrene was increased in an amount corresponding to the amount of polystyrene in S-graft polymer F used in Example B4.

EXAMPLES B6 and B7

Resin compositions were prepared in the same manner as in Example B1 except for using S-graft polymers G and H prepared in Preparation Examples 8 and 9, respectively, in place of S-graft polymer F used in Example B1. Physical properties of the thus-obtained resin compositions are shown in Table B2.

TABLE B2

| Example | Formulation* (parts by weight) | | | | | | Izod Impact Strength (kg·cm/cm) | Tensile Strength (kg/cm²) | Heat Distortion Temperature (°C.) |
|---|---|---|---|---|---|---|---|---|---|
| | PPO | PS | PG | (kind) | SG | (kind) | | | |
| Example B2 | 30 | 40 | 20 | (B) | 20 | (F) | 19.4 | 520 | 117 |
| Example B3 | 30 | 40 | 20 | (C) | 20 | (F) | 22.6 | 520 | 117 |
| Example B4 | 30 | 40 | 20 | (D) | 20 | (F) | 25.3 | 510 | 116 |
| Comparative Example B3 | 30 | 50 | 20 | (D) | — | | 11.3 | 530 | 118 |

TABLE B2-continued

| Example | Formulation* (parts by weight) | | | | | | Izod Impact Strength (kg·cm/cm) | Tensile Strength (kg/cm²) | Heat Distortion Temperature (°C.) |
|---|---|---|---|---|---|---|---|---|---|
| | PPO | PS | PG | (kind) | SG | (kind) | | | |
| Example B5 | 30 | 40 | 20 | (E) | 20 | (F) | 23.6 | 520 | 117 |
| Example B6 | 30 | 40 | 20 | (A) | 20 | (G) | 21.8 | 520 | 118 |
| Example B7 | 30 | 40 | 20 | (A) | 20 | (H) | 22.5 | 530 | 117 |

*PPO: Poly-2,6-dimethyl-1,4-phenylene ether
PS: Polystyrene
PG: Polyphenylene ether-grafted polyolefin
SG: Polystyrene-grafted polyolefin
English alphabets in the parentheses after parts by weight of PG and SG indicate the kinds of the polymers prepared in Preparation Examples.

weight. Physical properties of the thus-obtained resin composition are shown in Table B3.

TABLE B3

| Example | Compounded Amount* (parts by weight) | | Izod Impact Strength (kg·cm/cm) | Tensile Strength (kg/cm²) | Heat Distortion Temperature (°C.) |
|---|---|---|---|---|---|
| | Ethylene/Vinyl Acetate/Glycidyl Methacrylate Copolymer | Styrene/Maleic Anhydride Copolymer | | | |
| B8 | 10 | 10 | 21.7 | 530 | 119 |
| B9 | 20 | 10 | 26.8 | 510 | 116 |
| B10 | 10 | 20 | 23.8 | 540 | 121 |

*In addition, 40 parts by weight of polyphenylene ether and 50 parts by weight of polystyrene were commonly compounded.

EXAMPLE B8

40 Parts by weight of the polyphenylene ether and 50 parts by weight of the polystryene used in Example B1 were compounded with 10 parts by weight of an ethylene/vinyl acetate/glycidyl methacrylate copolymer (made by Mitsubishi Petrochemical Co., Ltd.; MFR=3; content of glycidyl methacrylate: 8 wt%; content of vinyl acetate: 4 wt%) and 10 parts by weight of a styrene/maleic anhydride copolymer (made by Arco Chemical Co., Ltd.; content of styrene: 92%; content of maleic anhydride: 8 wt%), and dry-blended in a super-mixer. Then, the blend was kneaded at 280° C. in a twin-screw extruder made by Ikegai Iron Works, Ltd. to allow the graft reaction to proceed in a molten state, and extruded to obtain a pelletized resin composition.

The thus obtained resin composition was fractionated by a xylene-dissolving method and subjected to IR absorption spectrum analysis. As a result, a graft polyphenylene ether produced by the reaction between the terminal phenol group of polyphenylene ether and the glycidyl group of the ethylene/vinyl acetate/glycidyl methacrylate copolymer was found to exist in an amount of 4.5 wt% of the whole composition, and that a graft polystryene copolymer produced by the reaction between the maleic anhydride group of the styrene/maleic anhydride copolymer and the glycidyl group was found to exist in an amount of 6.3 wt% of the whole composition.

Physical properties of test pieces obtained by injection molding this composition in the same manner as in Example B1 are shown in Table B3.

EXAMPLE B9

The same procedures as described in Example B8 were conducted except for changing the amount of the ethylene/vinyl acetate/glycidyl methacrylate copolymer to 20 parts by weight. Physical properties of the thus-obtained resin composition are shown in Table B3.

EXAMPLE B10

The same procedures as described in Example B8 were conducted except for changing the amount of the styrene/maleic anhydride copolymer to 20 parts by weight. Physical properties of the thus-obtained resin composition are shown in Table B3.

While the invention has been described in detail and with reference to specific embodiments thereof, it will be apparent to one skilled in the art that various changes and modifications can be made therein without departing from the spirit and scope thereof.

What is claimed is:

1. A polyphenylene ether resin composition having improved proccessability and impact resistance, which comprises:
   (1) 80 to 20 parts by weight of a polyphenylene ether;
   (2) 20 to 80 parts by weight of a styrene homopolymer or copolymer containing at least 25% styrene monomer units, the styrene monomer units of said homopolymer or copolymer being of the formula:

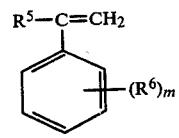

wherein $R^5$ represents hydrogen, lower alkyl or halogen, $R^6$ represents hydrogen, halogen, lower alkyl or vinyl and m represents an integer of 1 to 5; and
   (3) 0.1 to 50 wt%, based on the total weight of said polyphenylene ether and said styrene homopolymer or copolymer, of a polyphenylene ether grafted onto a polyolefin formed by reacting a polyphenylene ether or a polyphenylene ether having acid or acid anhydride groups with a glycidylated polyolefin or by reacting a glycidylated polyphenylene ether with a polyolefin having acid or anhydride groups.

2. The polyphenylene ether resin composition of claim 1, wherein said polyolefin having an acid group or acid anhydride group or having a glycidyl group has a crystallinity of 20 wt% or more.

3. The polyphenylene ether resin composition of claim 1, wherein said polyphenylene ether grafted onto a polyolefin is a chemically bonded product between a polyolefin having a glycidyl group and having a crystallinity of 20 wt% or more and a polyphenylene ether.

4. The polyphenylene ether resin composition of claim 1, wherein said polyphenylene ether grafted onto a polyolefin is a chemically bonded product between a copolymer of olefin and acrylic or methacrylic acid glycidyl ester and a polyphenylene ether.

5. The polyphenylene ether resin composition of claim 4, wherein said copolymer additionally contains a vinyl monomer.

6. The polyphenylene ether resin composition of claim 1, wherein said styrene homopolymer is polystyrene, poly-alpha-methylstyrene, polychlorostyrene or polystyrene modified with rubber and wherein said styrene copolymer is styrene/acrylonitrile copolymer, styrene/butadiene/acrylonitrile copolymer, styrene/maleic anhydride copolymer or styrene/maleic anhydride/butadiene copolymer.

7. The polyphenylene ether resin composition of claim 1, wherein the molecular weight of the polyphenylene ether moiety of said graft polymer is within the range of 5,000 to 100,000.

8. A polyphenylene ether resin composition having excellent impact resistance, which comprises:
  (1) 80 to 20 parts by weight of a polyphenylene ether;
  (2) 20 to 80 parts by weight of a styrene homopolymer or copolymer containing at least 25% styrene monomer units, the styrene monomer units of said homopolymer or copolymer being of the formula:

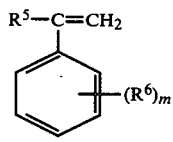

wherein $R^5$ represents hydrogen, lower alkyl or halogen, $R^6$ represents hydrogen, halogen, lower alkyl or vinyl and m represents an integer of 1 to 5;
  (3) 0.1 to 50 wt%, based on the total weight of the polyphenylene ether and said styrene homopolymer or copolymer, of a polyphenylene ether grafted onto a polyolefin formed by reacting a polyphenylene ether or a polyphenylene ether having acid or acid anhydride groups with a glycidylated polyolefin or by reacting a glycidylated polyphenylene ether with a polyolefin having acid or anhydride groups; and
  (4) 1 to 80 wt%, based on the total weight of the polyphenylene ether and the styrene homopolymer or copolymer, of a polystyrene grafted onto a polyolefin having a crystallinity of at least 20%.

9. The polyphenylene ether resin composition of claim 8, wherein said polyphenylene ether grafted onto a polyolefin is a chemically bonded product between a copolymer of olefin and glycidyl acrylate or methacrylate and a polyphenylene ether.

10. The polyphenylene ether resin composition of claim 8, wherein said polystyrene grafted onto a polyolefin is a chemically bonded product between a polyolefin having a glycidyl group in side chain and a styrenic copolymer having carboxylic acid group or cyclic acid anhydride group in the main chain or side chains of polystyrene.

11. The polyphenylene ether resin composition of claim 8, wherein said styrene homopolymer is polystyrene, poly-alpha-methylstyrene, polychlorostyrene or polystyrene modified with rubber and wherein said styrene copolymer is styrene/acrylonitrile copolymer, styrene/butadiene/acrylonitrile copolymer, styrene/maleic anhydride copolymer or styrene/maleic anhydride/butadiene copolymer.

12. The polyphenylene ether resin composition of claim 8, wherein the polyolefin of the polyphenylene ether-grafted onto a polyolefin component having an acid or acid anhydride group or glycidyl group has a crystallinity of at least 20 weight percent.

13. The polyphenylene ether resin composition of claim 9, wherein said polyphenylene ether-grafted polyolefin is obtained by grafting an ethylene/vinyl acetate/glycidyl(meth)acrylate copolymer onto a polyphenylene ether or a polyphenylene ether having acid groups or anhydride groups.

* * * * *